(12) United States Patent
Perry et al.

(10) Patent No.: US 7,632,005 B2
(45) Date of Patent: Dec. 15, 2009

(54) DISCONNECT AND LOCKING SYSTEM AND METHOD OF DISASSEMBLY AND REASSEMBLY

(76) Inventors: Carlos Perry, 8142 Tall Timber Dr., Gainesville, VA (US) 20155; Richmond Way Perry, 9559 Tudor Oaks Dr., Manassas, VA (US) 20110

( * ) Notice: Subject to any disclaimer, the term of this patent is extended or adjusted under 35 U.S.C. 154(b) by 109 days.

(21) Appl. No.: 11/537,473

(22) Filed: Sep. 29, 2006

(65) Prior Publication Data

US 2007/0076442 A1    Apr. 5, 2007

Related U.S. Application Data

(60) Provisional application No. 60/721,988, filed on Sep. 30, 2005.

(51) Int. Cl.
  *H01R 33/00*    (2006.01)

(52) U.S. Cl. .................. 362/655; 362/223; 362/376; 362/640; 362/657
(58) Field of Classification Search ............... 362/217, 362/223, 376–378, 640, 655, 657
  See application file for complete search history.

(56) References Cited

U.S. PATENT DOCUMENTS 6,039,460 A * 3/2000 Ng et al. .................. 362/267
2005/0243555 A1 * 11/2005 Waldmann ............... 362/267

* cited by examiner

*Primary Examiner*—Sandra L O'Shea
*Assistant Examiner*—Meghan K Dunwiddie
(74) *Attorney, Agent, or Firm*—Greenblum & Bernstein P.L.C.

(57) ABSTRACT

A locking and disconnect system for use with an ultraviolet lighting system used in a waste management system. The system includes a light coupled to a housing having a cam receiving portion. The system further includes a cell for housing the light. The cell includes a cam locking mechanism engageable with the cam receiving portion of the housing.

23 Claims, 5 Drawing Sheets

FIGURE 1
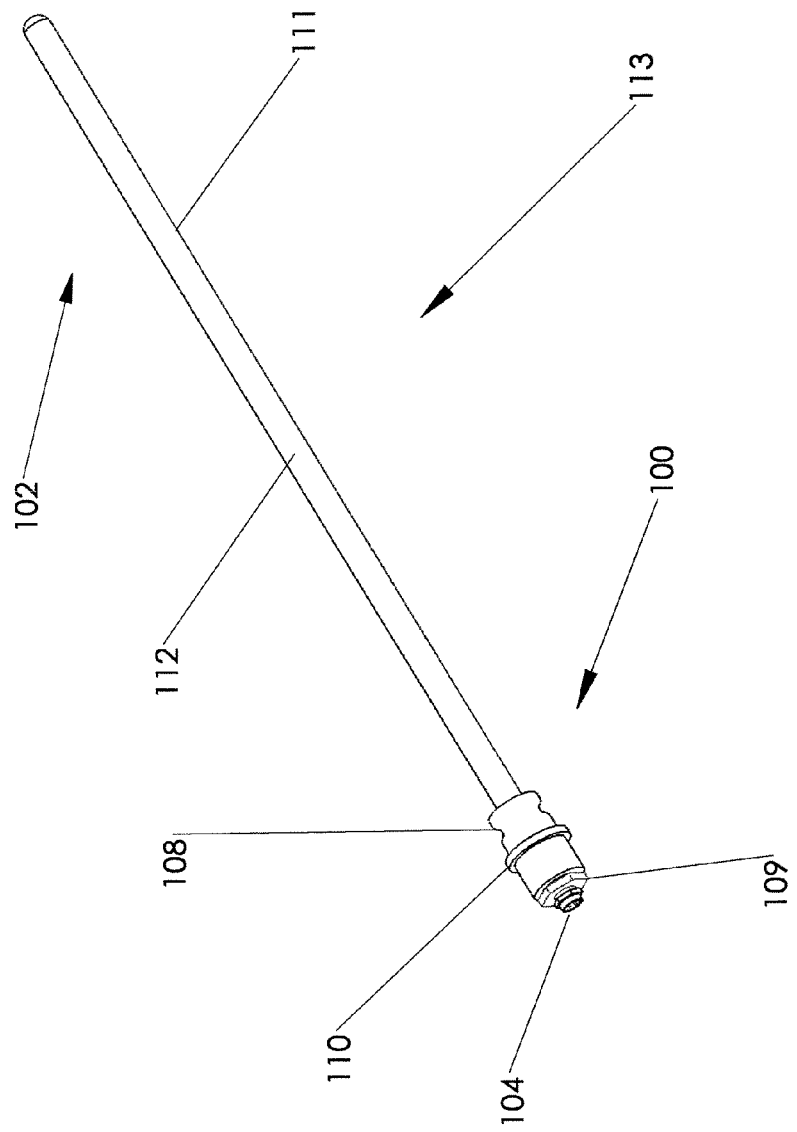

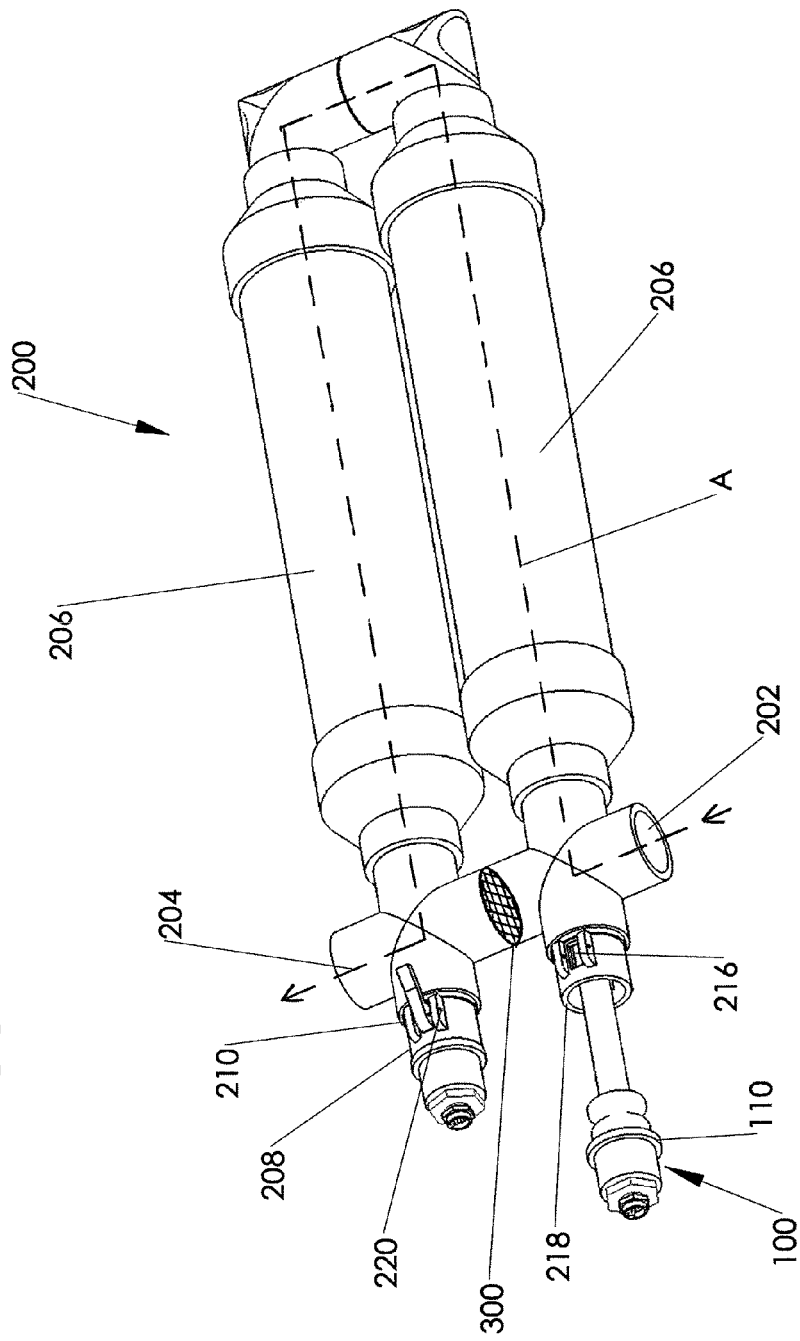

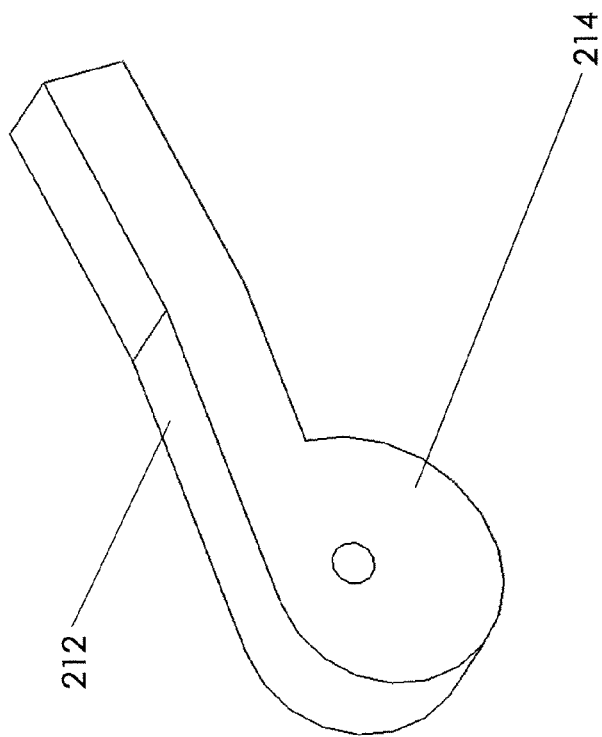
FIGURE 3

DISCONNECT AND LOCKING SYSTEM AND METHOD OF DISASSEMBLY AND REASSEMBLY

CROSS REFERENCE TO RELATED APPLICATIONS

This application claims priority to provisional application No. 60/721,988 filed on Sep. 30, 2005, the contents of which are incorporated herein by reference in their entirety.

BACKGROUND OF THE INVENTION

1. Field of the Invention

The invention generally relates to a locking and disconnect system and, more particularly, to a locking and disconnect for an ultraviolet lighting system used to treat effluent in a wastewater management system.

2. Discussion of Background Information

Wastewater can be treated with a disinfection unit which is a system that kills disease-causing microorganisms in wastewater, and is used when discharge on the surface is permitted. In one implementation, ultraviolet light systems are available to treat good quality effluent, such as that from properly functioning aerobic units and sand filters. Additionally, ultraviolet light systems are applicable to any water treatment or purification, including, for example, home use for well water and anywhere soil may not percolate.

SUMMARY OF THE INVENTION

In a first aspect of the invention, a lighting system includes a light coupled to a housing having a cam receiving portion. The system further includes a cell for housing the light. The cell includes a cam locking mechanism engageable with the cam receiving portion of the housing.

In embodiments, the housing is male portion locking system and the cell comprises a neck which is a female portion of the locking system. The housing is seated within the neck. The system further includes a sleeve which protects the light. The sleeve is sealed to the housing for housing the light in a watertight manner. The system also includes a socket configured to electrically connect the light to a power supply. The light is an ultraviolet light bulb. The cam receiving portion is at least one of a flute, groove and indentation. The cam receiving portion is about an entire periphery of the housing. The cam receiving portion is about portions of the housing. The cell includes a neck portion and the housing includes a flange configured to seat on the neck portion. A seal is between the neck portion and the housing. The housing includes a reducer portion having threaded engagements configured to engage a portion of the housing and a socket. The cam locking mechanism is engageable with the cam receiving portion through a hole in a neck of the cell. The cam locking mechanism is two cam mechanisms. The cam locking mechanism includes a handle and a cam portion hingedly mounted to the cell. The cell comprises an intake and a discharge. The cell is configured to have a plurality of light accommodating areas each configured to accommodate a light, the plurality of light accommodating areas being in series.

In another aspect of the invention, a disconnect and locking light assembly includes a housing having a cam receiving portion, a light, and a protective sleeve coupled to the housing and configured to seal the light therein with the housing.

In another aspect of the invention, a method of replacing a light in a disconnect and locking light system includes unsealing a protective sleeve from a housing having a cam receiving portion and removing the protective sleeve from the housing. The method further includes disconnecting a light from an electrical connecting system, removing the light from the housing and placing another light into the housing and connecting the another light to the electrical connecting system. The method also includes placing the protective seal over the light and sealing the protective sleeve to the housing.

BRIEF DESCRIPTION OF THE DRAWINGS

The invention is described in the detailed description which follows, in reference to the noted plurality of drawings by way of non-limiting examples of exemplary embodiments of the invention, in which like reference numerals represent similar parts throughout the several views of the drawings, and wherein:

FIG. 1 shows a lighting assembly in accordance with the invention;

FIG. 2 shows a plan view of system in accordance with the invention;

FIG. 3 shows a cam mechanism used with the locking and disconnect system in accordance with the invention;

DETAILED DESCRIPTION OF EMBODIMENTS OF THE INVENTION

Figure 4:
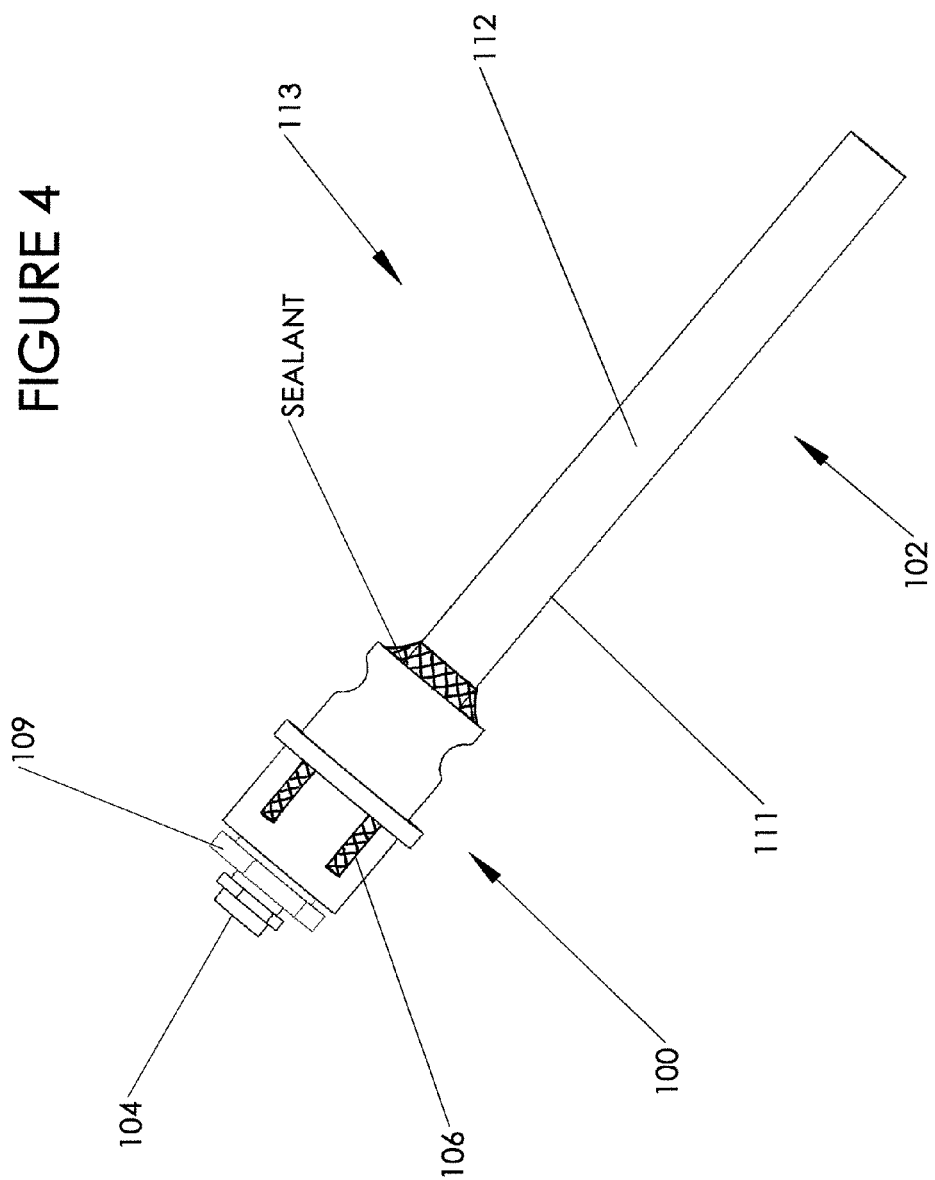
FIG. 4 shows a lighting assembly in accordance with the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The invention is directed to a quick disconnect and locking system for use in, for example, an ultraviolet lighting system used in a wastewater management system. In implementation, the quick disconnect and locking system of the invention facilitates the disassembly and reassembly of the lighting system for use in the wastewater management system. The quick disconnect and locking system includes a connection system which allows a light to be easily removed from a cell, without the need for special tools and the like. In this manner, the wastewater management system will not have to be off-line for long periods of time during maintenance thereof, e.g., changing of the light. The invention also contemplates the use of two or more lights, implemented with the quick disconnect and locking system to provide a redundancy to the system.

FIG. 1 shows a lighting system with a locking and disconnect system together forming the lighting assembly in accordance with the invention. The locking system is generally shown as reference numeral 100, the lighting system is generally shown as reference numeral 102, and the lighting assembly is generally shown as reference numeral 113. In embodiments, the lighting system 102 is shown connected to the locking and disconnect system 100.

The locking and disconnect system 100 comprises a housing 106 (male portion of the locking system). The housing 106 may have a hollow interior forming a passage. A socket 104 is housed in the locking and disconnect system 100 which facilitates electrical connection between the lighting system and a power source, e.g., control system. In general, the socket 104 is configured to electrically connect the light 112 of the lighting system 102 to a control via wiring and connector assemblies. The connector assemblies may be a two pole connector and a four-prong adapter, or other conventional system. In one implementation, the light 112 is an ultraviolet bulb manufactured by Atlantic Ultraviolet Corporation of Hauppauge, N.Y.

The housing 106 comprises, in embodiments, a cam receiving portion 108. The cam receiving portion 108 may be a groove, flute or other type of indentation which provided about the entire or portions of the circumference of the housing 106. The locking and disconnect system 100 further includes a flange 110, which may be used to seat against a shoulder of the cell, as discussed in more detail below. The lighting system 102 may include a protective sleeve 111, e.g., quartz sleeve, which is fitted about the light 112 and in watertight connection with the housing 106. The water tight connection may be provided by a sealant within the housing 106, e.g., silicon. The protective sleeve 111 is configured to protect the light 112 when submerged, either partially or fully, within a fluid.

FIG. 2 shows a plan view of the system in accordance with the invention. As shown in FIG. 2, the lighting assembly 113 (the locking and disconnect system 100 and accompanying lighting system 102) is configured to be coupled, e.g., locked and unlocked) to a cell 200. In FIG. 2, one locking and disconnect system is shown partially removed from the cell 200; whereas, the other locking and disconnect system 100 is shown connected to the cell 200. In embodiments, the lighting system 102 is substantially a same length as the cell 200.

It should be understood that the cell 200 may be made of any suitable material. For example, the cell may be made of poly vinyl chloride (PVC) piping, preferably schedule 80 PVC piping. Additionally, the PVC piping may be treated with ultraviolet inhibitors to prevent PVC degradation during exposure to UV light. Alternatively, the cell may be made of stainless steel, or other metal or alloy, and may utilize the reflective properties of the material to further enhance treatment of the effluent.

The cell 200 includes an intake 202, an exit or discharge 204 and a chamber(s) 206 for accommodating the lighting system 102. The chamber(s) 206 as well as the intake 202, discharge 204 and other features may be of any size and shape suitable for water applications such as wastewater treatment systems, to name but one type of application. The flow rates may be any rate suitable for the application, dependent upon the chamber size, intake and discharge sizes. Preferably, the flow rate may be about 10 gallons/minute, although other flow rates are contemplated by the invention.

In embodiments, in a multi-chamber configuration, a seal 300 is provided between the intake 202 and the discharge 204 so that effluent will not bypass treatment by the lighting system 102. In implementation, effluent will enter through the intake 202 and pass over the lighting system 102 in order to be disinfected. The effluent will then be discharged through the discharge 204. (See arrow "A".) By using two or more lights 112 (bank of lights) one light 112 can fail while another light 112 is still functioning, thus ensuring that the effluent continues to be disinfected. Additionally, a current sensor, photo sensor, or other conventional mechanisms may be used with the system to determine when a light 112 is no longer properly functioning, thus providing an indication to the operator that a light 112 is not working.

The cell 200 includes a neck 208 portion (female portion of the locking system) which includes a cam locking mechanism 210 on one or more sides of the neck 208. The cam locking mechanism 210 includes a handle portion 212 and a cam portion 214 (FIG. 3). The cam locking mechanism 210 is hinge mounted to the neck 208 via a pin 220, for example. In the locked state, the cam portion 214 engages the groove, flute or other type of indentation 108 of the locking and disconnect system through an opening 216 within the neck 208.

The neck 208 further includes a shoulder 218. In embodiments, the flange 110 of the housing 106 rests on the shoulder 218 of the neck 208. An o-ring or other seal may be placed within the neck 208 so that the housing 106 can be tightly sealed to the neck 208. Thus, in the locked position, the o-ring or other seal is compressed between the housing 106 and the neck 208, providing a water tight seal.

FIG. 4 shows a view of the lighting assembly 113 of FIG. 1. As shown, in one embodiment, the protective sleeve 111 is sealed to the housing 106 by an sealant such as, for example, an epoxy sealant. This ensures that effluent or other liquid does not interfere with the operations of the light 112.

Figure 5:
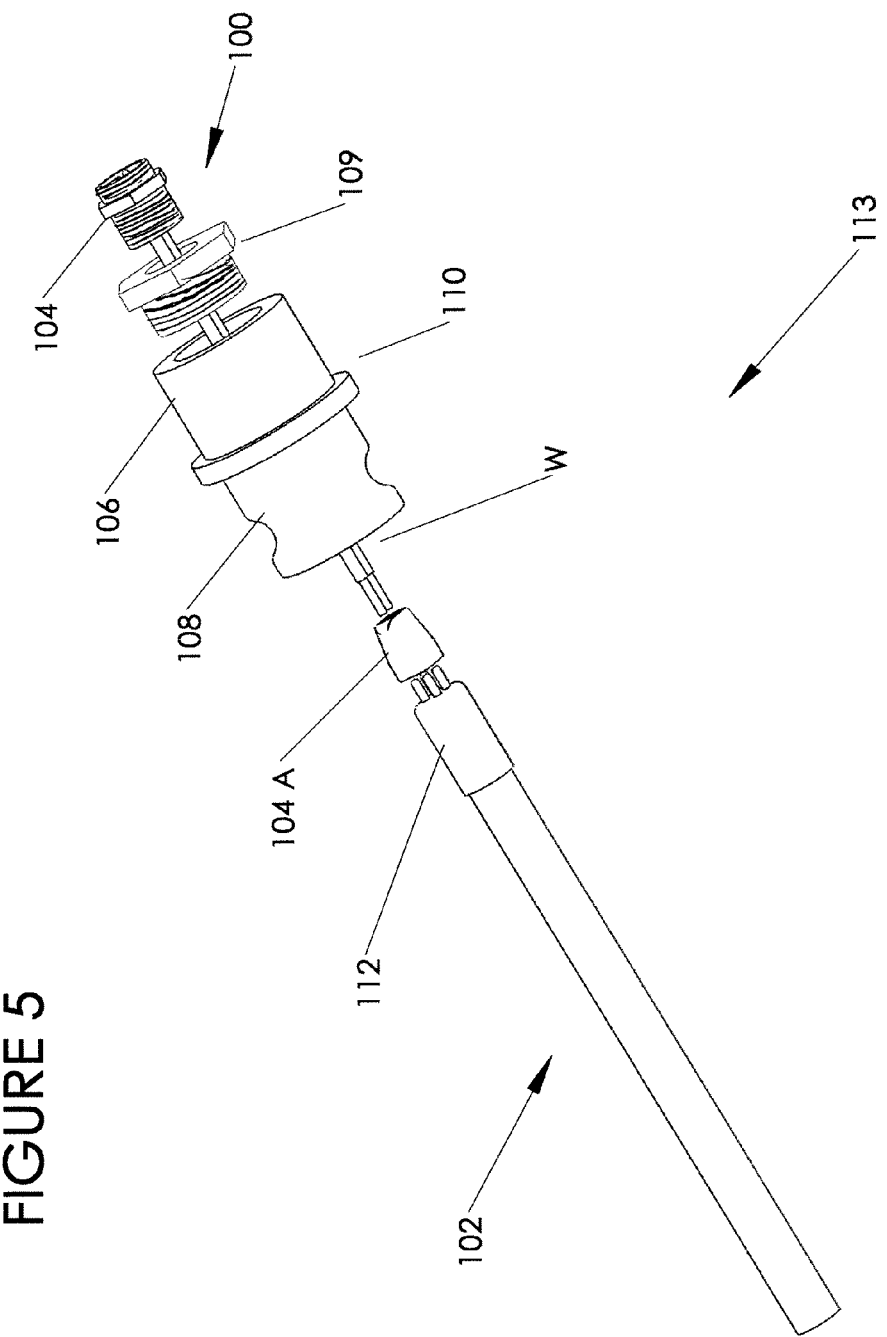
FIG. 5 shows an exploded view of the lighting assembly in accordance with the system.

FIG. 5 shows an exploded view of the lighting assembly 113 in accordance with the invention. As shown, in one embodiment, the housing 106 includes a flange 110 and cam receiving portion 108. The cam receiving portion 108 is shown to be a groove about the entire circumference of its main housing portion. It should be recognized, as discussed above, that the cam receiving portion 108 may also be other configurations. The locking and disconnect system 100 further includes a reducer portion 109 having a threaded connection with the housing 106 and the socket 104. The socket 104, for example, includes a four-prong adapter 104a electrically connectable to the light 112. The four-prong adapter 104a is electrically connected to the tapered two pole connector via wires W.

Operation

In operation, the lighting system 102 will be placed within the chamber(s) of the cell. Once the lighting system 102 is completely within the cell, the flange 110 will seat on the shoulder 218 of the neck 208. The groove, flute or other type of indentation 108 will align with the opening 216, and the user can push the handle 212 of the cam towards the neck until the cam portion 214 engages the cam receiving portion 108. This will lock the lighting assembly 113 into the cell 200.

In order to replace a faulty light 112, an operator unlocks the quick release locking mechanism, removes the light bulb assembly 113 from the cell, places another light bulb assembly 113 into the cell 200, and locks the new light bulb assembly 113 in place. That is, the user disengages the cam portion 214 from the groove, flute or other type of indentation 108. The light bulb assembly 113 is then removed from the cell 200.

Method of Disassembly and Assembly

In order to change the light bulb 112 within the light bulb assembly 113, the operator would remove the protective sleeve 111 from the locking and disconnect system 100 effectively breaking the seal between the protective sleeve 111 and the housing 106. Additionally, there may be a seal between the protective sleeve 111 and the reducer portion 109, which is also effectively broken. The operator then disconnects the faulty light bulb 112 from the socket adapter 104a and replaces it with a functioning light bulb 112, reconnecting the light bulb 112 to the adapter 104a. Next the operator would place the protective sleeve 111 about the light bulb 112 and seal the sleeve 111 to the housing 106 and the reducer portion 109.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A lighting system, comprising:
    a light coupled to a housing having a cam receiving portion; and
    a cell for accommodating the light and including a cam locking mechanism engageable with the cam receiving portion of the housing,
    wherein the cam locking mechanism includes a handle and a cam portion hingedly mounted to the cell.

2. The lighting system of claim 1, wherein:
    the housing is male portion locking system and the cell comprises a neck which is a female portion of the locking system, and
    the housing is seated within the neck.

3. The lighting system of claim 1, further comprising a sleeve protecting the light, the sleeve being sealed to the housing for housing the light in a watertight manner.

4. The lighting system of claim 1, further comprising a socket configured to electrically connect the light to a power supply.

5. The lighting system of claim 1, wherein the light is an ultraviolet light bulb.

6. The lighting system of claim 1, wherein the cam receiving portion is at least one of a flute, groove and indentation.

7. The lighting system of claim 1, wherein the cam receiving portion is about an entire periphery of the housing.

8. The lighting system of claim 1, wherein the cam receiving portion is about portions of the housing.

9. The lighting system of claim 1, wherein:
    the cell includes a neck portion; and
    the housing includes a flange configured to seat on the neck portion.

10. The lighting system of claim 1, further comprising a seal between the neck portion and the housing.

11. The lighting system of claim 1, wherein the housing includes a reducer bushing having threaded engagements configured to engage a portion of the housing and a socket.

12. The lighting system of claim 1, wherein the cam locking mechanism is engageable with the cam receiving portion through a neck of the cell.

13. The lighting system of claim 1, wherein the cell is configured to have a plurality of light accommodating areas each configured to accommodate a light, the plurality of light accommodating areas being in series.

14. A disconnect and locking light assembly, comprising:
    a housing having a cam receiving portion;
    a light;
    a protective sleeve coupled to the housing and configured to seal the light therein with the housing; and
    a cell for accommodating the protective sleeve, the cell including a cam locking mechanism engageable with the cam receiving portion, wherein the cam locking mechanism includes a handle and a cam portion hingedly mounted to the cell.

15. The disconnect and locking light assembly of claim 14, wherein the light is an ultraviolet light bulb.

16. The disconnect and locking light assembly of claim 14, further comprising a socket accommodated at least partially within the housing and in electrical connection with the light.

17. The disconnect and locking light assembly of claim 16, wherein the socket comprises a two-pole connector in electrical communication with an adapter which connects to the light bulb.

18. The disconnect and locking light assembly of claim 14, wherein the cam receiving portion comprises one of a groove, a flute and an indentation.

19. The disconnect and locking light assembly of claim 18, wherein the cam receiving portion is provided about an entire circumference of the housing.

20. The disconnect and locking light assembly of claim 18, wherein the cam receiving portion is provided at portions of the circumference of the housing.

21. The disconnect and locking light assembly of claim 14, wherein the housing includes a flange.

22. The disconnect and locking light assembly of claim 14, further comprising a reducer bushing having thread portions engagable with a socket and a portion of the housing.

23. The disconnect and locking light assembly of claim 14, further comprising a sealant within the housing creating a water-tight seal between the protective sleeve and the housing.

* * * * *